Figure 1:
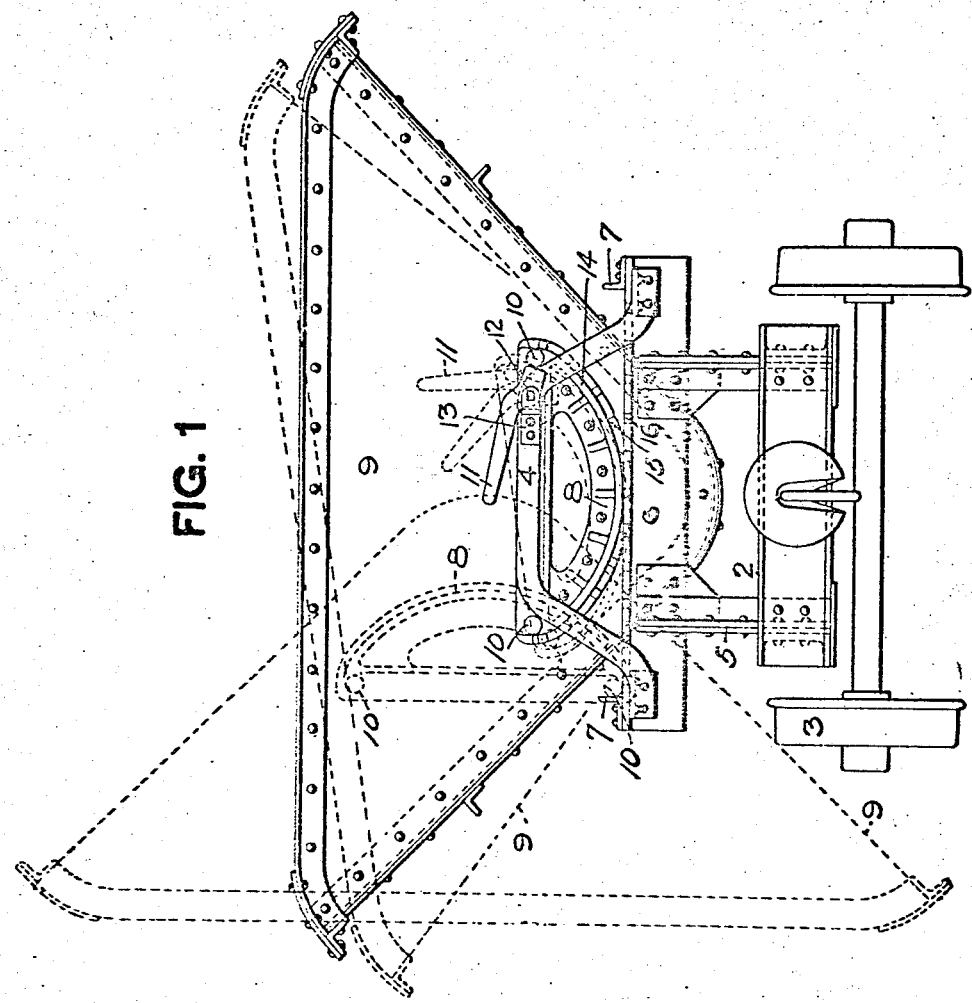

K. H. HANSEN.
DUMP CAR.
APPLICATION FILED NOV. 11, 1907.

899,108.

Patented Sept. 22, 1908.
2 SHEETS—SHEET 1.

WITNESSES.

INVENTOR.

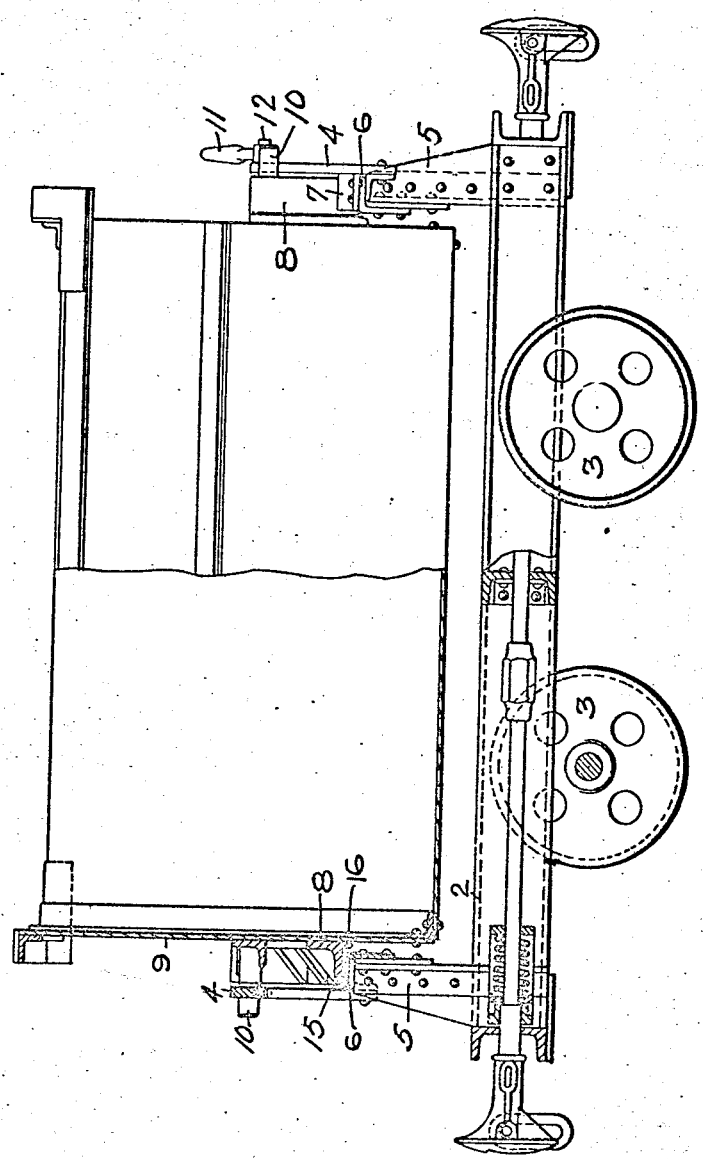

UNITED STATES PATENT OFFICE.

KARL H. HANSEN, OF PITTSBURG, PENNSYLVANIA, ASSIGNOR TO ARTHUR KOPPEL COMPANY, OF PITTSBURG, PENNSYLVANIA.

DUMP-CAR.

No. 899,108.　　　Specification of Letters Patent.　　Patented Sept. 22, 1908.

Application filed November 11, 1907. Serial No. 401,684.

*To all whom it may concern:*

Be it known that I, KARL H. HANSEN, a resident of Pittsburg, in the county of Allegheny and State of Pennsylvania, have invented a new and useful Improvement in Dump-Cars; and I do hereby declare the following to be a full, clear, and exact description thereof.

My invention relates to dump cars.

The object of my invention is to provide a car of this character which is low-built and which may be readily dumped and brought back to position, while at the same time to provide mechanism by means of which the car may be locked in its normal position and released from either side, the car being automatically locked upon its return after dumping To these ends my invention comprises the novel features hereinafter set forth and claimed.

In the accompanying drawing Figure 1 is an end elevation of my improved car, dotted lines showing the car in dumping position; Fig. 2 is a side elevation partly in section.

In the drawings the numeral 2 designates a suitable truck frame which may be built up of angle-bars, gusset plates, etc., suitably braced to form a rigid structure. This truck frame is mounted upon the wheels 3. Struts or guides 4 are riveted to the angles 6 of the truck frame and said struts form guides for the cradles 8 secured to the ends of the car body 9. The angles 6 are carried by the uprights 5. The cradles 8 are provided with the pins or projections 10 which are adapted to engage the downwardly extending inclined arms of guides or struts 4. Angles 7 on the angle bars 6 form stops for the pins 10 when the car is dumped. At each end of the car at opposite sides thereof are the levers 11 which are pivoted at 12 in brackets 13 on the guide bars 4. The pins 10 engage the inner ends of the levers 11 so as to lock the car body in its upright or normal position. The weight of the long arms of the levers 11 holds the levers down normally in the position shown in full lines in Fig. 1. The cradles 8 are formed with the cycloid or compound curve 14 and said cradles rest on the top of the angle bars 6. The cradles have the teeth 15 formed thereon which are adapted to engage the openings 16 in the angles 6.

When the car is loaded and it is desired to dump the same to the left the operator standing on the opposite side of the car lifts the lever 11 and throws it to the upright position indicated in dotted lines Fig. 2. This releases the pin or enlargement 10 whereupon the operator by pushing on that side of the car adjacent to him is readily able to throw the car into the dumping position, the cradles 8 rocking over angle bars 6. As the car is carried to its dumping position the projections 10 are guided by the downwardly extending inclined arms of the guide bars 4 as indicated in dotted lines Fig. 2 until said projections come in contact with the stops 7. The lever 11 will be in the path of the pin 10 and will be moved to its normal position after the car body has been freed, and when the car body is brought back to its normal position after dumping the lug 10 will engage the inner end of said lever and will lift said lever sufficiently to allow said lug to assume the position indicated in Fig. 1, whereupon the weight of the long arm of said lever 11 will cause said lever to assume its normal position and so automatically lock the car body in its upright position. By this locking mechanism practically no effort is required upon the part of the operator to unlock the car, and no danger due to accidents caused by forgetfulness on the part of the operator to lock the car can occur. Furthermore, the car body is unlocked by the operator from the side opposite to that from which the dumping takes place so that there is no danger in the unlocking of the car body to the operator. The lever when turned to its unlocked position remains there so that the operator is able to use both his hands to dump the car. The locking mechanism is simple in construction and not liable to get out of order.

By the use of the cycloid curve on the cradles I am enabled to build the dump car lower, while at the same time there is greater adjustability of the cradle to different sizes of car bodies. By changing the location of the cradle in relation to the center of gravity of the car body a great range of possibilities can be obtained in regard to the more or less easy dumping or returning to center position of the empty car body. This curve, furthermore, permits of the easy dumping of the full car while the empty car will not return to its central position without exercising a light push a short part of the distance after which the cradles will automatically center themselves.

What I claim is:

1. In a dump car, the combination of the truck frame, a car body, a cradle resting on said frame, a projection on said cradle at one end thereof, a locking lever engaging said projection, and means for throwing said lever into locking position by the projection on said cradle on its return.

2. In a dump car, the combination of a truck frame, a car body, a guide carried by said truck frame, a cradle resting on said frame, and projections at each end of said cradle adapted to engage said guide.

3. In a dump car, the combination of the truck frame, a car body, a cradle on said frame, projections at opposite ends of said cradle, and inclined guide arms on said truck frame with which said projections engage.

4. In a dump car, the combination of the truck frame, a car body, a cradle on said frame, projections at opposite ends of said cradle, inclined guide arms on said truck frame with which said projections engage, and stops at the lower end of said guide arms.

5. In a dump car, the combination of the truck frame, a car body, an inverted U shaped guide bar carried by said truck frame, a cradle resting on said frame, and projections at each end of said cradle adapted to engage the downwardly extending inclined arms of said guide bar.

In testimony whereof, I the said KARL H. HANSEN have hereunto set my hand.

KARL H. HANSEN.

Witnesses:
ROBERT C. TOTTEN,
J. R. KELLER.